United States Patent [19]
Frasier

[11] Patent Number: 5,511,623
[45] Date of Patent: Apr. 30, 1996

[54] QUICK HITCH GUIDANCE DEVICE

[75] Inventor: Michael E. Frasier, Lexington, Nebr.

[73] Assignee: Orthman Manufacturing, Inc., Lexington, Nebr.

[21] Appl. No.: 304,257

[22] Filed: Sep. 12, 1994

[51] Int. Cl.⁶ .................................................. A01B 69/06
[52] U.S. Cl. .............................. 172/6; 172/191; 180/131
[58] Field of Search ................................. 172/2, 5, 6, 26, 172/190, 191; 280/455.1, 474, 412, 413; 180/79, 131; 364/424.01, 424.07; 318/580, 587

[56] References Cited

U.S. PATENT DOCUMENTS

| | | | |
|---|---|---|---|
| Re. 34,080 | 9/1992 | Schmidt | 172/5 |
| 3,326,319 | 6/1967 | Schmidt | 172/6 |
| 4,607,716 | 8/1986 | Beck | 172/6 X |
| 4,640,365 | 2/1987 | Schmidt | 172/26 |
| 4,835,691 | 5/1989 | Rotem et al. | 172/6 X |
| 4,930,581 | 6/1990 | Fleischer et al. | 172/6 |
| 5,029,650 | 7/1991 | Smit | 172/5 |
| 5,031,704 | 7/1991 | Fleischer et al. | 172/6 |
| 5,044,447 | 9/1991 | Langeoire | 172/26 |
| 5,170,849 | 12/1992 | Nikkel et al. | 172/26 |
| 5,181,572 | 1/1993 | Andersen et al. | 172/6 |
| 5,207,739 | 5/1993 | Orthman | 172/5 |
| 5,224,551 | 7/1993 | Sukup | 172/6 |
| 5,240,079 | 8/1993 | Schmidt | 172/6 |
| 5,246,077 | 9/1993 | Tjaden et al. | 172/450 |
| 5,255,756 | 10/1993 | Follmer et al. | 172/6 X |
| 5,392,863 | 2/1995 | Fixemer | 172/6 |

Primary Examiner—Terry Lee Melius
Assistant Examiner—Victor Batson
Attorney, Agent, or Firm—Zarley, McKee, Thomte, Voorhees & Sease

[57] ABSTRACT

The invention relates to a quick hitch guidance system which allows an operator to maintain proper alignment with a farm implement while towing it behind a tractor. The device includes an exterior inverted U-shaped frame with an external quick hitch coupling element. Within the frame there is attached a double rod hydraulic cylinder which operatively moves internal linkage within the frame so that the distance between the device and the tractor is increased on one side and decreased on the other thereby steering the implement into proper alignment. The implement moves independent of the tractor so that as the tractor deviates laterally from alignment with the crop rows, the position of the implement is corrected and aligned with the rows to prevent crop damage.

6 Claims, 4 Drawing Sheets

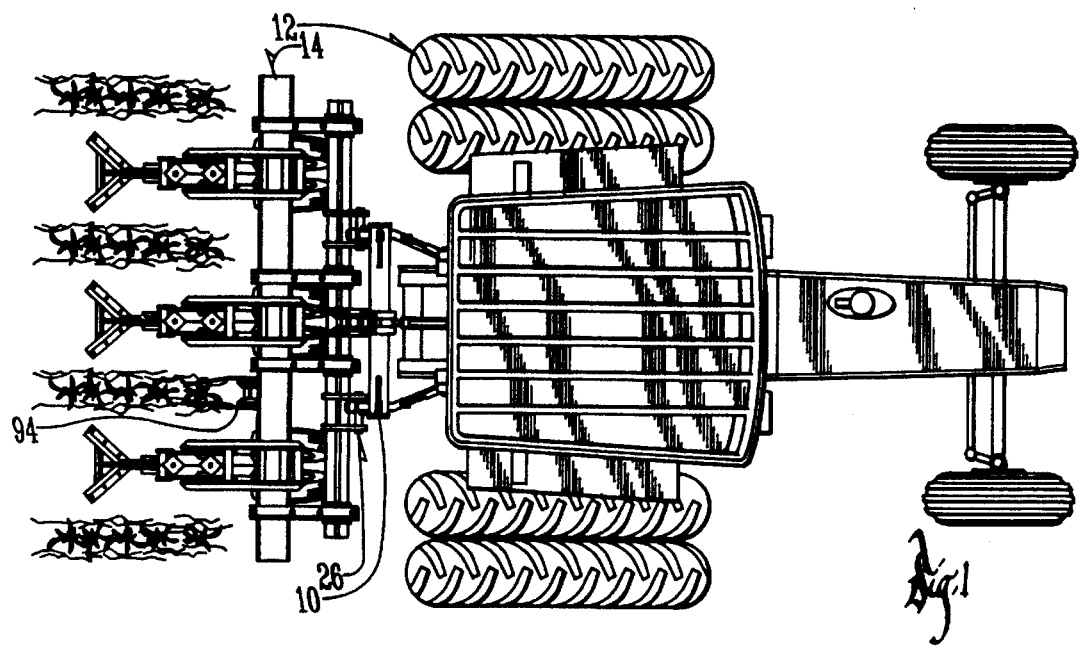
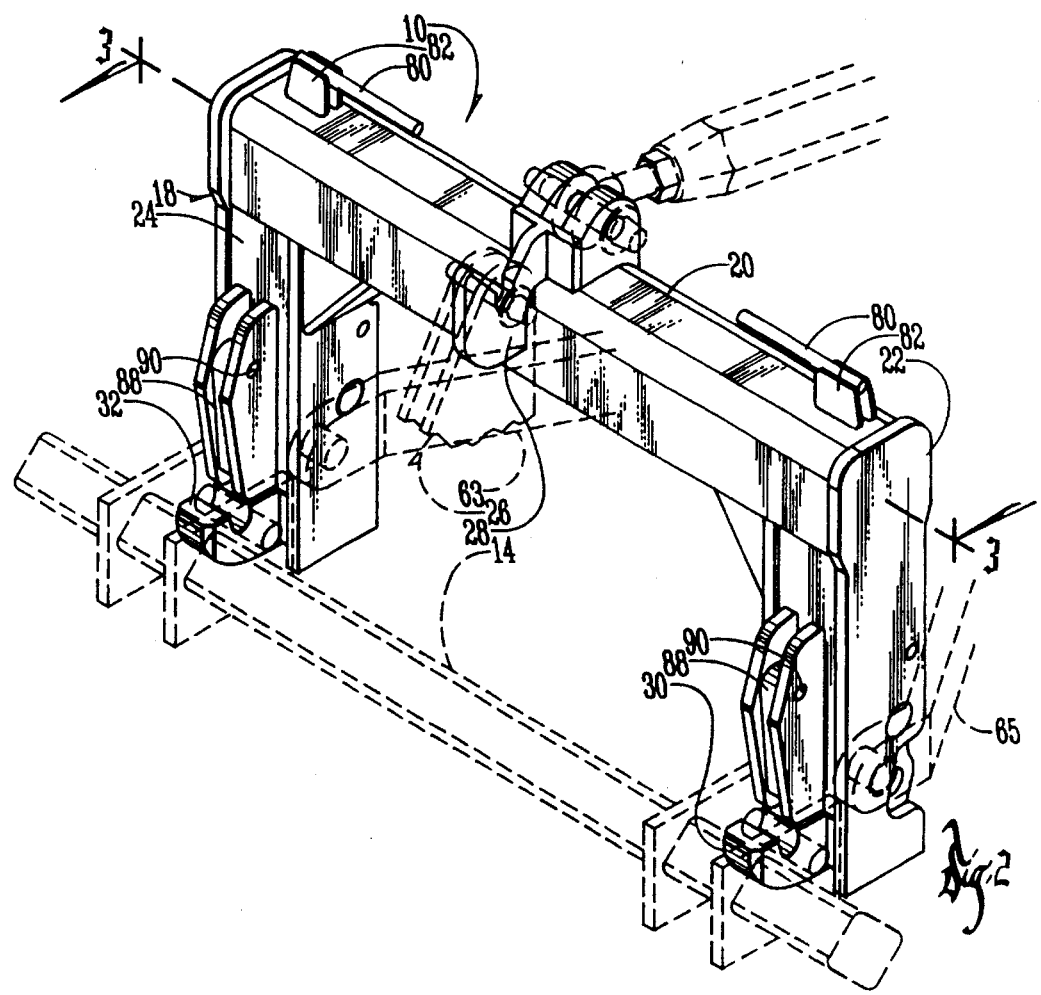

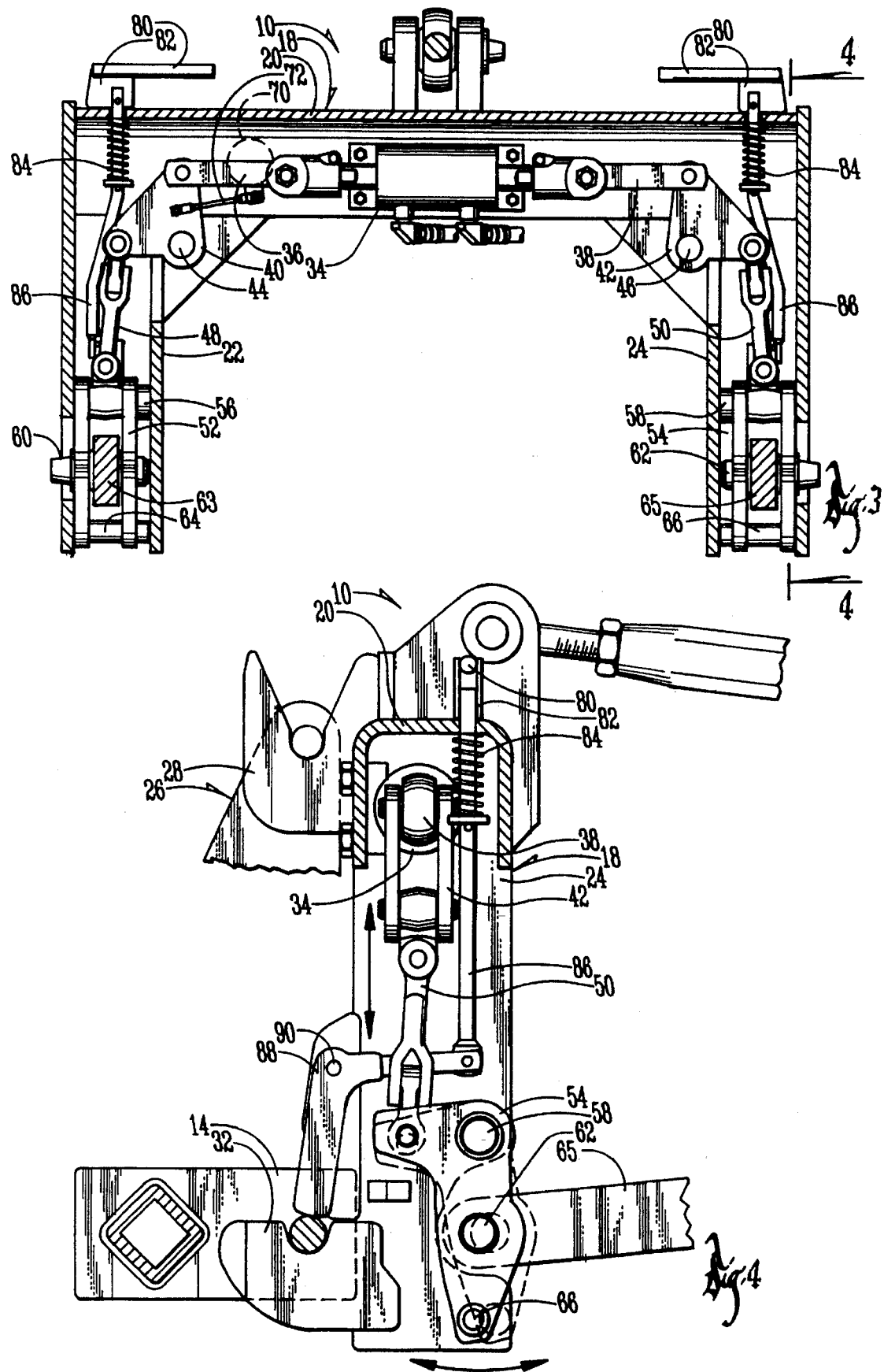

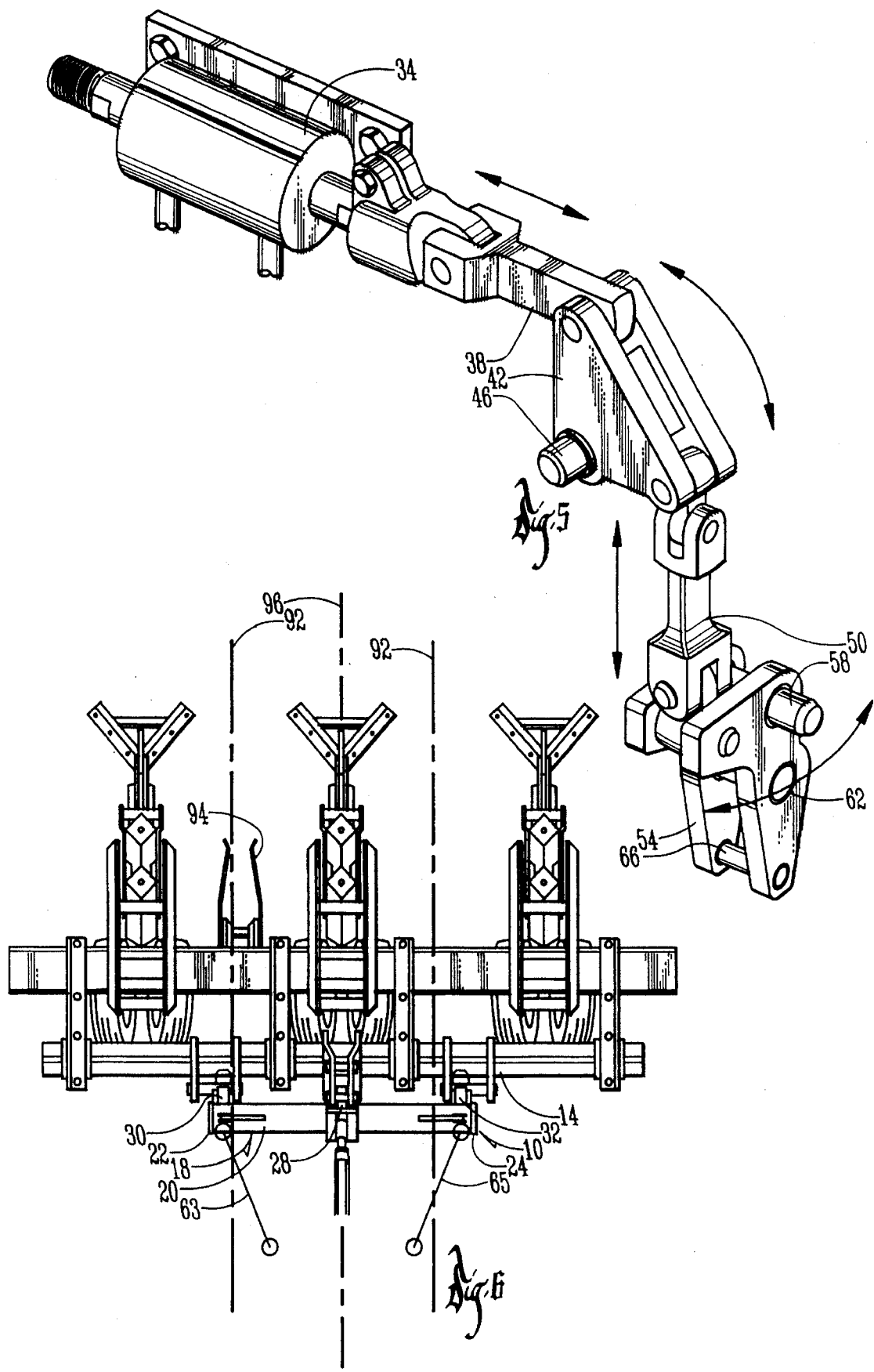

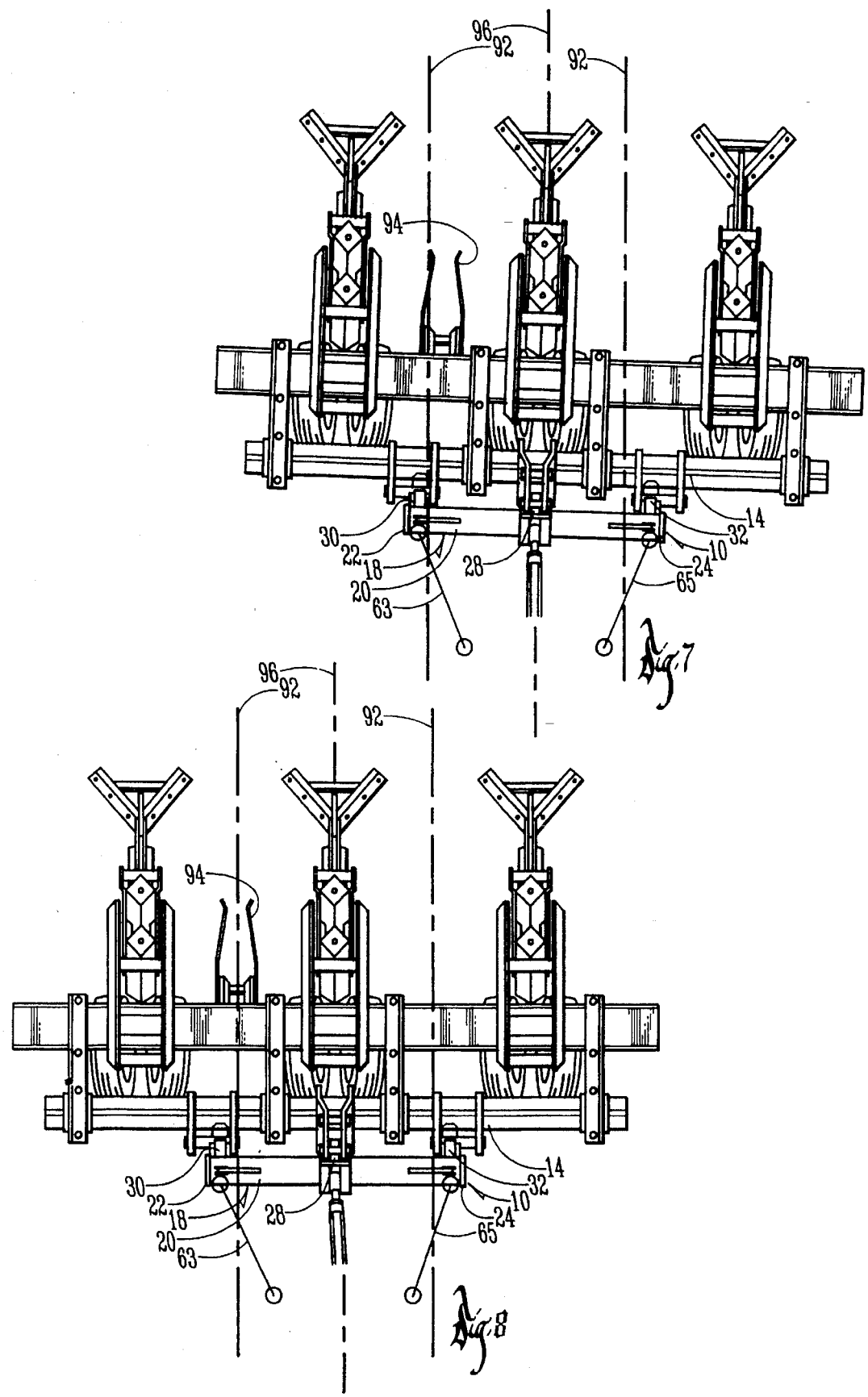

QUICK HITCH GUIDANCE DEVICE

BACKGROUND OF THE INVENTION

This invention relates to a device attached to tractor-drawn implements which will steer the tractor-drawn implement into a position aligned to follow the row independent of the position of the tractor. More particularly, the present invention relates to a guidance system which pivots to alter the angle of an implement, thereby allowing the coulter or other ground-engaging elements to steer the implement into a corrected position.

It has long been a problem in the operation of farm equipment to guide various implements through a crop field, without accidentally deviating from the crop row and destroying planted crops. Various tractor-drawn implements may carry ground-working tools spaced closely together. The tractor operator is generally situated in a cab located several feet above and forward of the implement, so that it is difficult to view the actual engagement of the tools with the ground. All the operator can do is attempt to keep the tractor centered relative to the rows.

The problem of maintaining the ground-working tools between the crop rows becomes critical in an operation such as cultivating where only a slight lateral misalignment of the tractor with the rows will cause the implement to uproot several rows of crops. This problem is enhanced as the operator spends many hours in the field following long rows of crops. In the small amount of time it takes to turn from observing the implement to look forward to align the tractor in the rows, a few feet of crops can be uprooted due to a slight misalignment of the implement with the crop row.

Various guidance devices are currently found in the prior art. Guidance devices make it possible to speed across fields during cultivation. There are generally two classifications of guidance systems currently marketed: horizontal/sliding and pivoting. Sliding hitches travel horizontally to align the implement with the crop rows. Pivoting hitches vary the angle of the implement and as a result of coulters or ground-engaging elements, steer the implement back to alignment with the rows. One main problem of current pivoting hitches is that the implement is steered by multiple hydraulics which easily become out of phase and require an unnecessarily high degree of maintenance. Further, many of these devices must be removed in order to utilize other attachments designed for attachment to a tractor.

SUMMARY OF THE INVENTION

Therefore, a primary objective of the present invention is the provision of an improved implement guidance device for guiding a tractor-drawn row crop implement and aligning the same with said rows.

Another objective of the invention is to provide a row following guidance device which will adjust the path of a tractor-drawn implement so that it will follow a crop row independently of the tractor's lateral position in relation to the crop rows.

A further objective of the present invention is to provide a row following guidance device which is automatically responsive to lateral movement of the implement, to correctly steer the implement deck to a row following position centered within the crop rows.

A further objective of the present invention is to provide a row following guidance device which may be easily and universally removed and attached to various implements.

ASAE standard S278.6 (1992) sets forth the requirements for the attachment of three-point hitch implements, or quick hitch couplers, to the rear of agricultural tractors. The requirements stated therein are hereby incorporated by this reference.

Another objective of the present invention is the provision of an improved implement guidance and steering device which can remain attached to the tractor all year without interference with other tractor attachments such as a power takeoff (PTO) option or a drawbar.

A still further objective of the present invention is the provision of an improved means for steering an implement wherein the linkage of the device is mechanically phased and therefore unaffected by the phase of any hydraulic equipment.

A further objective of the present invention is the provision of an improved implement guidance device which can be locked into place when the operator does not require the benefits of row guidance on the implement which he has hooked to the tractor's three-point hitch.

A further objective of the present invention is the provision of an improved implement guidance device which is economical, efficient in use, and which results in a durable assembly.

The present invention utilizes an inverted U-shaped mounting frame which can be connected to a tractor or similar towing implement. On the side of the frame opposite the tractor is a universal three-point quick hitch assembly. When it is determined by a guidance system that the implement is no longer aligned with the row crops, the power means within the inverted U-shaped frame causes the distance between one end of the frame and the tractor to increase while decreasing the distance between the other end of the frame and the tractor. This counter rotation points the implement's directional devices such as coulters, planter openers, gauge wheels, sweeps, shanks, and the like, in the lateral direction the implement needs to move in order to guide it back into alignment. In the preferred embodiment, this is accomplished by shifting a linkage system with a single double rod horizontally mounted hydraulic cylinder.

DESCRIPTION OF THE DRAWINGS

FIG. 1 is an overhead plan view of a tractor, the present invention, and a ground engaging implement.

FIG. 2 is an isolated perspective view of the present invention.

FIG. 3 is a sectional elevated front view of the present invention.

FIG. 4 is a sectional view taken along line 4—4 of FIG. 3.

FIG. 5 is an isolated view of the right linkage system of the present invention.

FIG. 6 shows an overhead view of an implement offset from crop row.

FIG. 7 shows the present invention pivoted to correct the implement.

FIG. 8 shows a corrected implement on row center while tractor is offset from row.

DETAILED DESCRIPTION OF THE PREFERRED EMBODIMENT

Referring to the drawings, numeral 10 generally refers to the quick hitch guidance device of the present invention which is typically attached to a tractor 12 or other towing implement and which is then used to steer an implement 14 into alignment. The implement may have coulters or other directional ground-engaging devices such as planter openers, gauge wheels, sweeps, and shanks.

In general, the quick hitch guidance device 10 includes an inverted U-shaped frame 18 having a horizontal section 20 and two vertical sections 22, 24. A conventional three-point hitch, designated generally at 26, is located on the exterior of the frame 18. The three-point hitch 26 is comprised of an upper hook 28 as well as two lower hooks 30, 32.

As shown in FIGS. 3 and 4, within the frame 18 and generally near the center of horizontal section 20 there is mounted a double rod hydraulic cylinder 34. Extending away from the hydraulic cylinder 34 within the frame 18 is the left and right cylinder links 36, 38. The left and right cylinder links 36, 38 are coupled respectively to the left and right upper bell cranks 40, 42. The left upper bell crank 40 is designed to rotate about the left upper pivot point 44. The right upper bell crank 42 is supported for pivotal movement about the right upper pivot point 46. The left bell crank link 48 extends from the left upper bell crank 40 to the left lower bell crank 52. The right bell crank link 50 extends from the right upper bell crank 42 to the right lower bell crank 54.

The left lower bell crank 52 is supported for rotational movement about the left lower pivot point 56. The right lower bell crank 54 is also supported for pivotal movement about the right lower pivot point 58. As the left lower bell crank 52 revolves around the left lower pivot point 56, the left draft linkage point 60 is extended or retracted proportionally. At the same time, the right draft linkage point 62 is extended or contracted whenever the right lower bell crank 54 rotates about the right lower pivot point 58. The movement of the left elements 36, 40, 48, 52, 60 and the right elements 38, 42, 50, 54, 62 are proportionate and oppositely responsive. That is, when actuated by the hydraulic cylinder 34, the left draft linkage point 60 will expand or contract opposite to and proportionally with the right draft linkage point 62. All motion can be curtailed by engaging the left and/or right lockout pin apertures 64, 66, and inserting lockout pins (not shown). This will prevent all pivoting motion of the present invention 10 and allow it to act like a standard quick hitch coupler device.

In order for a user to remotely determine the current offset of the quick hitch guidance device, a rotary potentiometer 70 can be mounted to the horizontal section 20 of the U-shaped frame. The potentiometer can then be connected to any moving element of the linkage system to sense offset in the linkage. In the embodiment illustrated, this feedback sensor assembly includes a sensor linkage 72 extending from potentiometer 70 to the upper left bell crank 40. Any rotary movement from its normal position will be sensed by potentiometer 70 and may be remotely viewable in the cab of tractor 12.

A left and right quick hitch locking mechanism is also provided. As best shown in FIGS. 3 and 4. Each locking mechanism is provided with handle 80, lever arm 82, bias or spring 84, lock linkage 86 and lock crank 88. FIG. 3 shows locking mechanism in its locked or operating position. Lock crank 88 is in its fully engaged position to hold implement 14 in the lower hook 32 of quick hitch 10. To unlock and remove implement 14 from hooks 30, 32, handle 80 must be lifted about lever arm 82, thereby raising lock linkage 86. When linkage 86 is raised, lock crank 88 rotates about lock pivot point 90 and moves crank 88 away from hook 30 allowing implement 14 to be lifted from hooks 28, 30, 32.

In operation, as best demonstrated externally by FIGS. 6–8 and internally by FIG. 5, tractor 12 causes implement 14 to become offset from crop row center line 92. Sensor 94 determines that implement 14 is offset from row 92. Implement travel is designated by 96. The sensor 94 is operatively connected to double-rod hydraulic cylinder 34. One such sensing construction which can be used is best described in U.S. Pat. No. 5,207,739, assigned to Orthman Manufacturing, Inc. This guidance device while intended to be mounted on the tractor, can be easily adapted for attachment to said implement. Other means for communicating the amount of offset and sensing the same are well known in the art. As shown in FIG. 5, the double rod hydraulic cylinder 34 causes linkage 38 to move left or right depending on the input from sensing means 94. As linkage 38 moves back and forth, driven by said hydraulic cylinder 34, upper bell crank 42 rotates about pivot point 46 responsively. This linear motion is transmitted to lower bell crank 54 via linkage 50. By rotating lower bell crank 54 about pivot point 58, draft linkage point 62 is moved back and forth, subsequently increasing or decreasing the distance between lower hooks 30, 32 and their respective draft linkage points 60, 62. Both sides of the linkage are mechanically in phase, i.e., change in distance between lower hook 32 and left draft linkage point 60 is equal but opposite in direction to the change in distance between lower hook 30 and right draft linkage point 62. As the distance between lower hooks 30, 32 and their respective draft linkage points 60, 62 is increased or decreased responsive to hydraulic cylinder 34, the quick hitch system 10 is pivoted and, as a result, the implement is angled left or right. The ground engaging elements then work to steer implement 14 onto its desired path of travel.

Double rod hydraulic cylinder 34 is of the type widely known in the art. With the preferred embodiment described above, an example of a cylinder used by Applicant comprises a 3" bore double rod cylinder having a 1.25" diamer rod and capable of a 2" stroke length. Use of this type of cylinder results in a total range of motion in draft link attachment point 62 of 2.125". The total pivot of implement 14 is roughly 15 degrees.

FIG. 7 shows this steering or angling of implement 14 as described above. FIG. 8 demonstrates an offset tractor 12 with an aligned implement 14. A user is then alerted of the offset by the potentiometer 70 and can adjust the travel of the tractor accordingly.

In the drawings and specification there has been set forth a preferred embodiment of the invention, and although specific terms are employed, these are used in a genetic descriptive sense only and not for purposes of limitation. Changes in the form and a proportion of parts as well as in the substitution of equivalents are contemplated as circumstances may suggest or render expedient without departing from the spirit or scope of the invention as further defined in the appended claims.

What is claimed is:

1. A guidance device for a tractor-drawn crop implement, comprising:

a generally inverted, U-shaped frame having means for attachment to a forward end of said implement;

a linkage means for controllably increasing the distance between one end of said frame and a tractor and decreasing the distance between the other end of said frame and said tractor, including a horizontal connecting rod supported for linear movement with respect to said frame between a right steer position and a left steer position; an upper bell crank responsively connected to said horizontal connecting rod and supported for rotational movement with respect to said frame about an upper pivot point; a vertical connecting rod coupled at one end to said upper bell crank; a lower bell crank responsively coupled to said vertical connecting rod and supported for rotational movement with respect to said frame about a lower pivot point, whereby linear movement of said horizontal connecting rod between said right steer position and said left steer position results in rotational movement of said lower bell crank; and hydraulic means activated by a specified stimulus for controllably moving said horizontal connecting rod between said right steer position and said left steer position.

2. The guidance device of claim 1 wherein said stimulus is provided by a sensing means capable of sensing lateral movements of said guidance device in relation to crop rows and transmitting signals to said hydraulic means whereby said implement is guideable along said crop row independently of lateral movement of said tractor.

3. The guidance device of claim 2 wherein said hydraulic means comprises one double rod hydraulic cylinder.

4. The guidance device of claim 3 wherein said lower bell crank includes a means for locking said linkage means and preventing movement therein.

5. The guidance device of claim 4 wherein said linkage means includes a feed back sensor capable of determining said distance between one end of said frame and said tractor and transmitting said distance to a user.

6. A guidance device comprising the combination of linkage means for controllably increasing the distance between a frame and tractor, said linkage means having an upper bell crank responsively connected to a horizontal connecting rod and supported for rotational movement with respect to said frame about an upper pivot point, with a vertical connecting rod coupled at one end to said upper bell crank, and a lower bell crank supported for rotational movement about a lower pivot point whereby linear movement of said horizontal connecting rod results in rotational movement of said lower bell crank for controllably moving said horizontal connecting rod between a right steer position and a left steer position.

* * * * *